United States Patent [19]
Dudis et al.

[11] 3,880,965
[45] Apr. 29, 1975

[54] APPARATUS FOR AERATING A LIQUID

[76] Inventors: Charles G. Dudis, 401 Tamarac Trl.; Charles R. Kemper, 3487 Far Hills Ave., both of Dayton, Ohio 45429

[22] Filed: Nov. 24, 1972

[21] Appl. No.: 309,257

[52] U.S. Cl. ............... 261/122; 239/145; 239/450; 261/124
[51] Int. Cl. ............................................. B01f 3/04
[58] Field of Search ............ 261/122, 124; 239/145, 239/542, 450

[56] References Cited
UNITED STATES PATENTS

| | | | |
|---|---|---|---|
| 1,792,286 | 2/1931 | Curry et al. | 261/122 |
| 2,718,275 | 9/1955 | Banks | 261/122 |
| 2,807,505 | 9/1957 | Weitzel | 239/145 |
| 3,063,689 | 11/1962 | Coppock | 261/122 |
| 3,242,072 | 3/1966 | Walker | 261/124 |
| 3,293,861 | 12/1966 | Hinde | 261/124 |
| 3,339,901 | 9/1967 | Walker | 261/124 |
| 3,375,209 | 3/1968 | Kemper | 117/135.5 A |
| 3,416,776 | 12/1968 | Gamer | 261/122 |
| 3,432,154 | 3/1969 | Danjes | 261/122 |
| 3,525,685 | 8/1970 | Edwards | 261/124 |
| 3,552,654 | 1/1971 | Thomas | 261/122 |
| 3,626,500 | 12/1971 | Dummann | 261/122 |
| 3,642,260 | 2/1972 | Danjes et al. | 261/122 |
| 3,677,936 | 7/1972 | Bastiaanse | 261/124 |

*Primary Examiner*—Frank W. Lutter
*Assistant Examiner*—William Cuchlinski, Jr.
*Attorney, Agent, or Firm*—Jacox & Meckstroth

[57] ABSTRACT

Air is diffused into a liquid from a flexible tube of thermoplastics sheet material having an air permeable upper portion and an air impermeable lower portion. The upper portion of the tube is formed by an open cellular sheet material defining micropores and channels which produce a high density of microbubbles of air within the liquid to cause a high absorption of oxygen by the liquid. The diffuser tube is retained or held within the liquid by end support members and by intermediate straps which connect with a generally horizontal support cable or rod. Valve means are provided for automatically removing condensation from within the tube, and deflector members protect the diffuser tube from the moving liquid and minimize coalescence of the bubbles. The tube may be reinforced by an inner ply of woven fabric material.

12 Claims, 9 Drawing Figures

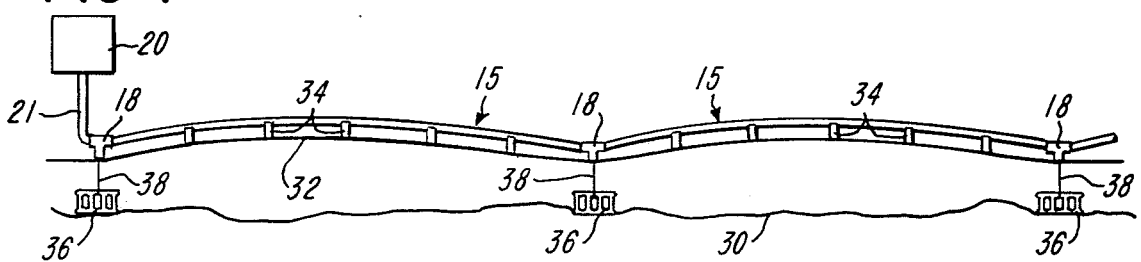
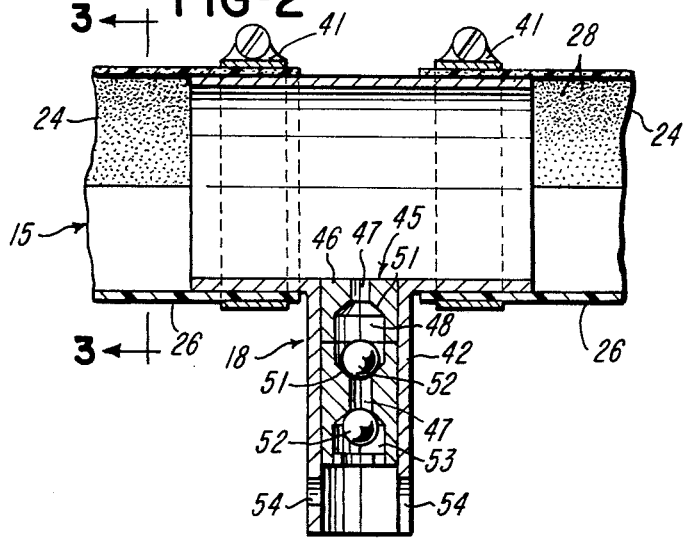
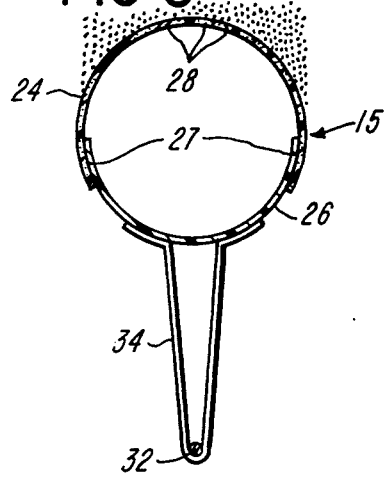
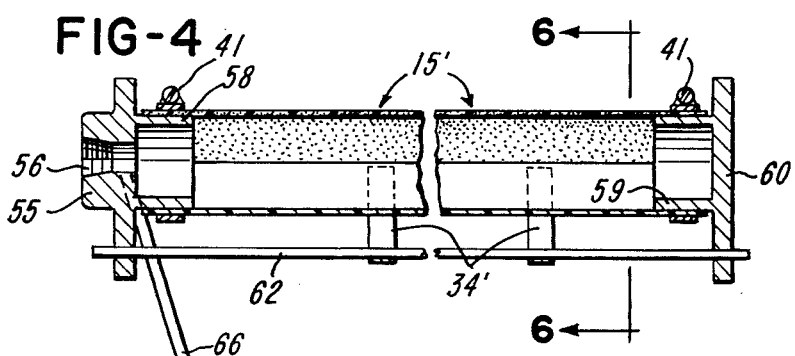
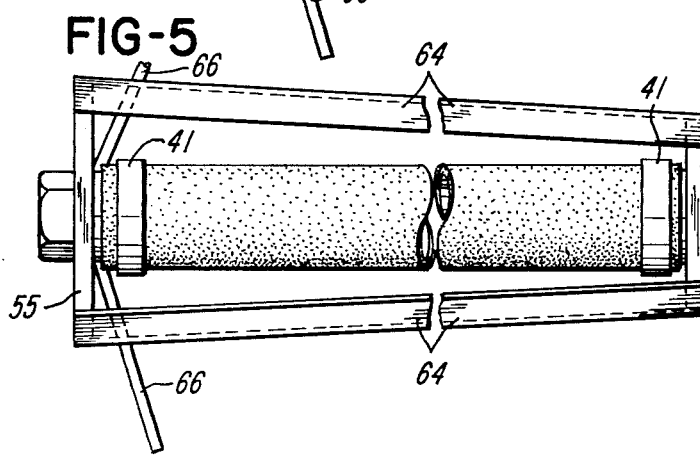
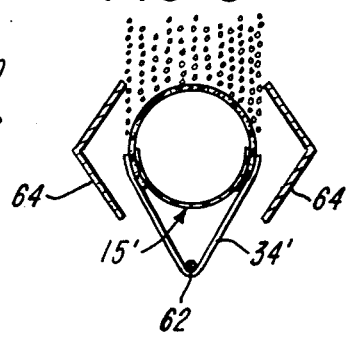

APPARATUS FOR AERATING A LIQUID

BACKGROUND OF THE INVENTION

In the art of aerating a liquid such as sewage within a tank or water within a pond, stream or the like, it is common to supply pressurized air to one or more rigid diffuser tubes located within the lower portion of the liquid. The air escapes upwardly into the liquid through small holes which are usually drilled within the tube and have a diameter of approximately one-sixteenth inch.

It has been found that a greater number of substantially smaller holes within the diffuser tube provides a significant increase in the absorption of the oxygen within the air into the liquid and thereby increases the efficiency of the system. Thus diffuser tubes have been produced from rigid porous materials such as porous carbon, metal and ceramic materials to produce a higher density of smaller air bubbles within the liquid. However, it has also been found that the rigid porous materials are easily clogged by a build-up of solid particles on the tube, thus requiring that the diffuser tubes be periodically removed and cleaned.

It has also been proposed to construct the air diffuser tubes with the use of a flexible woven fabric material. For example, U.S. Pat. No. 2,978,234 discloses such a fabric tube mounted on a rigid support base. However, the diffuser tubes disclosed in this patent are relatively complicated and expensive in construction, and woven fabric material tends to collect solid particles which eventually clog the interstices of the fabric. In addition, it is difficult to control the size and spacing of the air passage within the fabric to minimize coalescence of the bubbles. Futhermore, the replacement of the fabric material shown in the patent and the cleaning of the fabric support base cannot be performed quickly and conveniently.

SUMMARY OF THE INVENTION

The present invention is directed to an improved apparatus and method for aerating a liquid and which provides for a high absorption of oxygen from the air by the liquid. As used herein, the term air is intended to include any form of gas such as oxygen, hydrogen, etc. The aeration apparatus of the invention is also simple and economical in construction and is adapted for convenient installation within a liquid such as sewage within a tank or water within a pond, stream or the like. The apparatus further minimizes coalescence of the air bubbles, provides for long dependable service with minimum maintenance and for automatic removal of any condensation which may form within the air diffuser tubes.

In accordance with the illustrated embodiments of the invention, an elongated flexible diffuser tube is constructed of a vinyl sheet material and is connected on at least one end to a pressurized air supply. The tube is retained or held in a generally horizontal position within the lower portion of the liquid by end fittings or couplings and a plurality of longitudinally spaced strap-like members which connect the diffuser tube to an elongated support cable or rod. The diffuser tube has an air permeable upper portion defined by open cellular pores within the vinyl material, and an air impermeable lower portion. Air escapes upwardly from the diffuser tube through the pores which form a high concentration of microbubbles. The fitting or coupling incorporates a float-actuated valve which provides for automatically removing any condensate forming within the diffuser tube, and deflector means are provided for protecting the diffuser tube when the liquid is circulating or flowing and for minimizing coalescence of the air bubbles.

Other features and advantages of the invention will be apparent from the following description, the accompanying drawings and the appended claims.

BRIEF DESCRIPTION OF THE DRAWINGS

FIG. 1 is a somewhat diagrammatic elevational view of an aeration device constructed in accordance with the invention;

FIG. 2 is an enlarged vertical section of a coupling portion of the aeration apparatus shown in FIG. 1;

FIG. 3 is a radial section taken generally on the line 3—3 of FIG. 2;

FIG. 4 is a reduced vertical section of another form of aeration apparatus constructed in accordance with the invention, and with a center portion broken away;

FIG. 5 is a plan view of the apparatus shown in FIG. 4;

FIG. 6 is a slightly enlarged section taken generally on the line 6—6 of FIG. 4;

DESCRIPTION OF THE PREFERRED EMBODIMENTS

Figure 7:
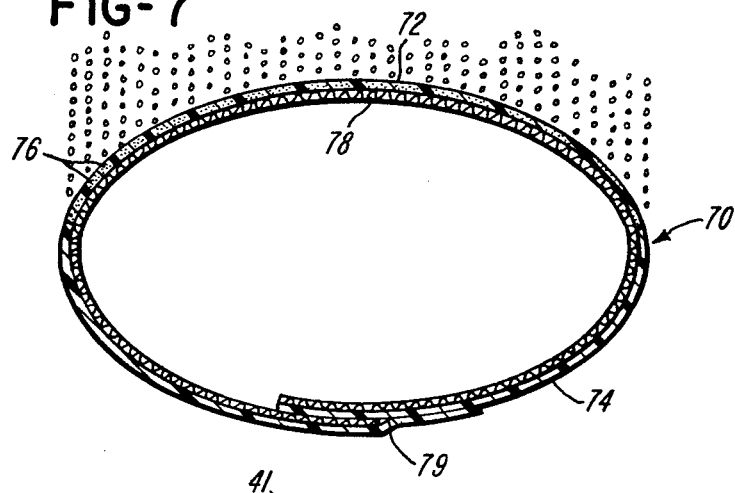
FIG. 7 is an enlarged radial section of a partially collapsed air diffuser tube constructed in accordance with a modification of the invention.

One embodiment of aeration apparatus constructed in accordance with the invention is illustrated in FIGS. 1-3. This apparatus incorporates a series of elongated flexible diffuser tubes 15, the adjacent ends of which are connected by a corresponding series of generally T-shaped couplings 18. One of the end couplings 18 is connected to receive a supply of air from a low pressure air compressor or blower 20 through a line or conduit 21. Each of the diffuser tubes 15 includes an upper portion 24 and a lower portion 26 which are joined together by overlapping bonded joints 27 extending along the length of the tube.

Both of the upper and lower portions of each tube 15 are formed of a flexible thermoplastics material. As illustrated in FIGS. 2 and 3, the upper portion 24 of each tube 15 is provided with a high concentration of open cellular pores 28 which generally range in size from approximately 0.0005 inch to approximately 0.005 inch. Preferably, the upper portion 24 is formed of a flexible porous sheet of polyvinyl chloride in accordance with the casting methods disclosed in U.S. Pat. Nos. 3,375,209 and 3,379,658 which issued to one of the co-inventors of the present invention. In general, these methods include the steps of mixing borax into a plastisol and then casting the mixture onto a moving endless forming belt or web to form a sheet. The sheet is heated to release the water of hydration from the borax and thereby form small channels and pores 28 through which a leaching medium is passed to remove the anhydrous borax.

The lower portion 26 is formed of a non-porous flexible film or sheet of polyvinyl chloride but may also be formed of other commercially available non-porous thermoplastics film or sheet material such as polyethylene or polypropolene. This non-porous lower section is designed to prevent air escaping below the mid-section of the tube and produce bubbles which would flow upwardly around the tube and coalesce with the bubbles from the upper portion of the tube to form undesirable larger bubbles. The tubes 15 are completely flexible and will collapse to generally flat conditions in response to the pressure of the surrounding liquid when the air supply is stopped.

As generally illustrated in FIG. 1, each diffuser tube 15 is located adjacent the bottom surface 30 of a stream, river, pond, etc., and extends generally horizontally in a slight arc as a result of the buoyancy of the tube within the liquid. The tubes 15 are retained or held in this location by a generally horizontal cable 32 which extends below the tubes 15 and is connected to the tubes by a series of longitudinally spaced flexible straps 34. The straps 34 are constructed of vinyl or other thermoplastics material and retain the tube with the arcuate configuration when air is supplied to the tube. This arcuate configuration of each tube provides for drainage of any condensation which forms within the tube towards the ends of the tubes and into the couplings 18. The cable 32 connects with the couplings 18, as will be explained later, and is retained in a generally horizontal position by weights 36 which rest upon the surface 30 and are connected by lines or cables 38 to the cable 32.

Referring to FIG. 2, adjacent ends of the diffuser tubes 15 are secured to the corresponding T-shape coupling 18 by adjustable hose clamps 41 or by O-rings surrounded by an axially movable sleeve having a tapered inner surface. Each of the couplings 18 includes a downwardly projecting tubular portion 42 which encloses a check valve 45. The valve 45 includes a tubular valve body 46 formed by upper and lower sections each having a center passage 47 which extends from the corresponding end of a larger diameter valve chamber 48. The chamber 48 cooperates with the passages 47 to define upper and lower annular valve seats 51 each having a frusto-conical configuration. A spherical float valve member or float ball 52 is confined within the chamber 48 and has a diameter somewhat smaller than the diameter of the chamber 48 but greater than the diameter of the passages 47. The ball 52 has a density or specific gravity which is less than that of water so that the buoyancy of the ball 52 is effective to urge the ball against the upper valve seat 51 when the coupling 18 is initially submerged within the water or liquid to be aerated. Another float ball 52 is located within a lower chamber 53 of the body 46 and is adapted to seat on a corresponding valve seat 51 to function as a check valve.

When the tubes 15 and couplings 18 are supplied with pressurized air from the blower 20, the upper float ball 52 is urged against the lower seat 51 as shown in FIG. 2. When condensate forms within the tubes 15, the moisture runs to the nearest coupling 18 and collects within the coupling on top of the upper float ball 52. The buoyancy of the float ball causes the ball to rise with the water above the lower seat 51 so that the water is forced through the passage 47, past the lower check valve float ball 52 and into the surrounding liquid by the air pressure within the coupling 18. When the condensate is exhausted, the lower float ball 52 is held against the corresponding lower seat 51 and thereby closes the passage 47 to prevent the surrounding liquid from flowing into the chamber 48. If any liquid does seep around the lower float ball 52 when the air supply is shut off, the upper float ball 52 will engage the upper seat 51. This provides double protection against the liquid flowing into the tubes 15.

The lower end portion of the tubular portion 42 is provided with diametrically opposed inverted L-shaped or bayonet slots 54. These slots 54 receive the cable 32, and the coupling is locked to the cable with a slight twisting action.

Referring to FIGS. 4–6, another embodiment of aeration apparatus constructed in accordance with the invention is adapted to be cantileverly supported from an air supply manifold. In this embodiment, a flange-type fitting 55 includes a threaded opening 56 which is connected to the air supply manifold (not shown). The fitting 55 includes an integral cylindrical portion 58 which receives one end portion of a flexible thermoplastics air diffuser tube 15' which is constructed in the same manner as the tube 15 described above in connection with FIG. 3. The opposite end of the flexible diffuser tube 15' connects with a cylindrical portion 59 of a flange-type fitting 60 which is connected to the fitting 55 by an elongated rigid rod 62. A series of straps 34' extend around the rod 32 and have end portions which are bonded to the lower portion of the tube 15' for retaining and holding the tube 15' in the same manner as the straps 34 retain the tube 15 in the embodiment shown in FIGS. 1–3.

A set of elongated rigid baffle or deflector members 64 (FIGS. 5 and 6) rigidly connect the fittings 55 and 60, and each deflector member 64 has a generally V-shaped cross-sectional configuration. The deflector members 64 are arranged in opposed relation on opposite sides of the diffuser tube and cooperate with the fittings 55 and 60 to form a rigid bracket assembly for supporting the diffuser tube 15'. This bracket assembly is designed to be cantileverly supported by the air supply manifold which is rigidly connected to the fitting 55. For example, a plurality of the units shown in FIGS. 4–6 may be located within the lower portion of a tank containing liquid sewage which is being circulated by power driven impellers. In such an installation, the deflector members 64 also function to protect the corresponding lightweight flexible diffuser tube 15' by deflecting the circulating liquid upwardly and downwardly around the diffuser tube.

Each bracket assembly and tube 15' may be inclined from the air supply manifold at a slight angle, and the fitting 55 or 60 or air supply manifold may incorporate a float valve system such as the system shown in FIG. 3 to provide for the removal of condensation from the tube 15'. As also shown in FIGS. 4 and 5, a set of rigid air exhaust tubes 66 project downwardly and outwardly from the fitting 55 at a compound angle. The tubes 66 provide for directing jets of air toward the bottom of the tank to assist in stirring up any sludge or sediment which tends to settle on the bottom of the tank.

Another form of an air diffuser tube constructed in accordance with the invention, is shown partially collapsed in FIG. 7. This diffuser tube 70 includes an air permeable upper portion 72 and an air impermeable lower portion 74 which are integrally cast by the method disclosed in the above patents. The micropores 76 are formed or produced only within the upper portion 72 of the tube 70 by mixing the borax material only within that portion of the liquid vinyl material or plastisol which is cast upon the endless support web to form the upper portion 72. The liquid plastisol or vinyl is cast onto a woven nylon cloth 78 which is carried by the support web so that the vinyl impregnates the nylon cloth and the cloth is permanently bonded to the vinyl after the vinyl cures. The porous woven nylon cloth serves to reinforce the vinyl and prevent the diffuser tube 70 from stretching after the tube has been in use for a substantial time.

As shown in FIG. 7, the tube 70 is formed by rolling a strip of the bonded cloth and vinyl material and heat-seaming the overlapping edge portions to form a positive joint 79 at the bottom of the non-porous lower portion 74 of the tube. As also illustrated in FIG. 7, the air escapes from the tube 70 through the pores 76 within only the upper portion 72 of the tube to form microbubbles in the same manner as described above in connection with the diffuser tube 15 shown in FIG. 3. Since no air escapes from the lower portion of the tube 70, there are no air bubbles produced from the lower portion of the tube, and thus there are no air bubbles flowing upwardly around the tube and coalescing with the microbubbles produced from the pores 76 to form larger air bubbles which result in less effective diffusion of oxygen into the liquid.

Figure 8:
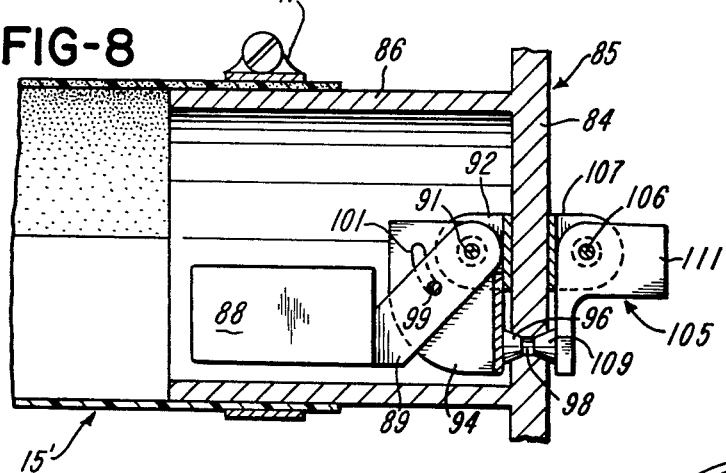
FIG. 8 is a fragmentary vertical section of a diffuser tube support fitting incorporating a float valve system for removing condensate from the tube in accordance with the invention.

Another valve system for removing condensate from within a diffuser tube without allowing the surrounding liquid to flow into the tube, is shown in FIG. 8. This valve system is adapted to be mounted on the substantially vertical end wall 84 of a fitting 85. The fitting 85 includes a cylindrical portion 86 to which is secured an end portion of a diffuser tube 15' by a hose clamp 41. The valve system includes a float member 88 which is mounted on an arm 89 pivotally supported by a rivet 91 extending through a U-shaped bracket 92 secured to the wall 84 of the fitting 85. The rivet 91 also supports a pivotal U-shaped valve member 94 having a frusto-conical tip portion 96 which normally seats within one end of a discharge port 98 formed within the wall 84.

A cross pin 99 extends through a hole within the arm 89, and the end portions of the pin 99 project into corresponding aligned arcuate slots 101 formed within the U-shaped valve member 94. The rivet 91 forms a friction connection with the bracket 92 so that the valve member 94 remains in any position to which it is pivoted. An L-shaped check valve member 105 is pivotally supported by a pin 106 extending through another U-shaped bracket 107 secured to the outer surface of the wall 84 of the fitting 85. The valve member 105 includes a frusto-conical tip portion 109 which is normally urged into the outer end of the port 98 as a result of a weighted head portion 111 of the valve member 105. An alternate check valve design could be spring loaded instead of weighted or it could be of the clapper type such as a spring leaf secured at one end to the fitting 85, and having a conical tip loosely attached to its other end.

The valve system shown in FIG. 8 operates in the following manner. The diffuser tube 15' and the fitting 85 are positioned level or inclined so that any condensate which forms within the tube 15 flows downwardly into the cylindrical portion 86 of the fitting 85. When the condensate collects within the fitting 85, the float member 88 rises. When the pin 99 engages the upper end of the slots 101, the valve member 94 is pivoted clockwise to open the inner end of the outlet port 98. As a result of the air pressure acting on the condensate, the condensate flows out the port 98 and past the tip portion 109 of the check valve member 105, which has been actuated in a counterclockwise direction by the outward flow of the condensate.

The valve member 94 remains open until the float member 88 drops and the pin 99 engages the lower ends of the slots 101. Continued lowering of the float member 88 is then effective to pivot the valve member 94 counterclockwise to its closed position shown in FIG. 8. Thus the valve system provides for automatic removal of condensate which collects within the fitting 85, and the check valve member 105 prevents the flow of the liquid surrounding the fitting 85 inwardly through the port 98 and into the diffuser tube 15.

Figure 9:
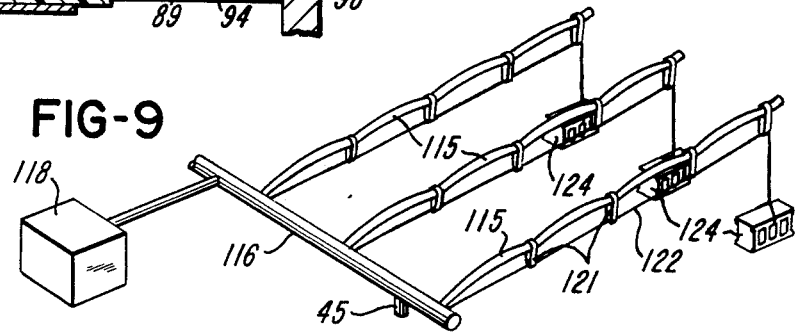
FIG. 9 is a fragmentary perspective view of another modified form of aeration apparatus constructed in accordance with the invention.

FIG. 9 shows another embodiment of an aeration apparatus constructed in accordance with the invention. In this embodiment, a series of diffuser tubes 115 project outwardly from a common air supply manifold 116 which connects with an air supply unit 118 such as an air compressor or blower. Each of the diffuser tubes 115 is constructed in the same manner as either the diffuser tube 15 referred to above in connection with FIG. 3 or the diffuser tube 70 referred to in connection with FIG. 7. Each diffuser tube 115 is retained or held within the liquid by a series of flexible vinyl bands or straps 121 which extend around the tube and also around a generally horizontal support element or cable 122. Each cable 122 extends from the manifold 116 to a corresponding weight member 124 adapted to rest on the bottom surface of the tank containing the liquid or on the bottom surface of a stream, river or pond. The slight incline of each of the diffuser tubes 115 provides for the drainage of any condensate which collects within the tube, back into the air supply manifold 116 where the condensate is forced from the manifold through a float-type check valve 45 in the manner described above in connection with FIG. 2.

From the drawings and the above description, it is apparent that an aeration device or apparatus constructed in accordance with the present invention, provides desirable features and advantages. For example, the construction of the diffuser tube 15 or 70 entirely from a flexible thermoplastic material and the formation of the open cells or pores only within the upper portion of the diffuser tube, provide for an effective diffuser tube of simple and economical construction so that the tube is disposable after it has had an extended period of use. In addition, the flexible diffuser tube provides for the release of extremely small microbubbles from only the upper portion of the diffuser tube, and these microbubbles result in producing a significant increase in the oxygen absorbed by the water or liquid being aerated.

The flexibility and smooth outer surface of the diffuser tube also minimizes the depositing and build-up of minerals or particles on the surface of the tube and thereby avoids closing the pores. In addition, slight pulsing of the air supply as a natural result of the air supply pump or by other means, produces continuous flexing of the tube to help minimize the deposition of particles, etc. Furthermore, the flexibility of the tube provides for collapsing the tube when the air supply is shut off so that the surrounding liquid does not seep into the diffuser tube and fill up the tube with liquid.

Another important feature is provided by the valve systems shown in FIGS. 2 and 8 which provide for the automatic removal of any moisture or condensate which forms within the diffuser tube so that the entire tube is always open for the flow of air through the tube. The apparatus further provides for a simplified support system for each of the tubes and which can be conveniently installed within the bottom portion of a tank, stream, pond, etc. Moreover, the support structure shown in FIGS. 4–6 not only supports the diffuser tube, but also provides for protecting the tube against the lateral forces created by the circulating or flowing liquid being treated. That is, the deflector members 64 are effective to deflect the flowing or circulating liquid from the flexible diffuser tube 15 and thereby enable the microbubbles to escape from the tube upwardly into the liquid with the minimum coalescing of the microbubbles into larger bubbles. In addition, the tapered or converging relation of the deflector members reduces the possibility of the unit vibrating at a resonant frequency, which is sometimes produced in some units by the supply pumps.

The embodiment of the diffuser tube shown in FIG. 7 provides for significantly increasing the strength of the diffuser tube so that stretching of the tube is minimized. However, it is apparent that the reinforcing woven cloth 28 shown in FIG. 7, could also be used in connection with the vinyl upper and lower portions of the diffuser tube 15 and 15' shown in FIGS. 3 and 6, respectively. It is also apparent that a diffuser tube constructed in accordance with the invention may have application other than reducing the turbidity of a liquid. For example, the gas diffuser tubes may be used in the lower portion of a body of liquid to effect circulation of the liquid and/or to produce a heat transfer between the gas and the liquid.

While the methods and forms of apparatus herein described constitute preferred embodiments of the invention, it is to be understood that the invention is not limited to the precise methods and forms of apparatus described, and that changes may be made therein without departing from the scope and spirit of the invention as defined in the appended claims.

The invention having thus been described, the following is claimed:

1. Apparatus for diffusing a gas into a liquid, comprising a flexible sheet-like thermoplastics material forming an elongated tube having opposite end portions, means engaging said end portions of said tube and arranged for positioning said tube generally horizontally within the liquid, said tube having a gas permeable upper portion continuously along the length thereof and formed by permanently opened pores within said flexible sheet-like material to provide for the escape of microbubbles of gas from said tube upwardly into the liquid above said tube, said tube having a substantially gas impermeable lower portion to avoid the escape of gas from said lower portion of said tube, said tube being inflatable to a substantially circular cross-sectional configuration when said tube is submerged in the liquid and gas is supplied to said tube to provide for maximum gas flow through said tube, said tube being collapsible to a generally flat configuration in response to the pressure of the liquid when the gas supply is cut off to avoid the seepage of liquid into said tube, support means including an elongated substantially rigid support member extending longitudinally below the center of said tube, and means connecting said tube to said support member intermediate said end portions of said tube and cooperating to provide for flexing of said tube between said substantially circular configuration and said generally flat configuration.

2. Apparatus as defined in claim 1 wherein said connecting means for said tube comprise a plurality of flexible straps connecting said tube to said support member at longitudinally spaced intervals along said tube.

3. Apparatus as defined in claim 1 wherein said support member comprises a flexible cable-like member.

4. Apparatus as defined in claim 1 wherein said support member comprises an elongated rigid rod.

5. Apparatus as defined in claim 1 including elongated deflector means positioned adjacent said tube in generally parallel spaced relation for deflecting a flow of the liquid from direct impingement against said tube and for minimizing coalescence of the gas bubbles discharged from said tube.

6. Apparatus as defined in claim 5 wherein said deflector means comprise a set of deflector members positioned in generally horizontally spaced opposed relation with said tube therebetween.

7. Apparatus as defined in claim 1 including means responsive to moisture within said tube for automatically removing moisture from said tube.

8. Apparatus as defined in claim 1 wherein said upper portion of said tube comprises a flexible porous vinyl sheet material having a non-uniform pattern of open cellular pores with an average size less than 0.005 inch.

9. Apparatus as defined in claim 8 wherein said porous vinyl sheet material includes a cloth-like material secured to said sheet material to provide said material with additional strength adjacent said open cellular pores.

10. A method of diffusing a gas into a liquid, comprising the step of casting a flexible sheet of porous vinyl material with a non-uniform pattern of permanently open cellular pores, forming an elongated collapsible tube with said sheet and locating said pores continuously along only an upper portion of said tube, submerging said tube within the liquid causing the tube to collapse to a generally flat configuration, supporting said tube within the liquid with said pores continuously along the upper portion of said tube, and directing a supply of gas into the tube for inflating the tube to a substantially circular cross-sectional configuration and to provide for the escape of gas through said pores upwardly into the liquid.

11. A method as defined in claim 10 wherein the step of casting said sheet of vinyl material includes the step of casting a mixture of said vinyl material and borax to provide for forming said pores with an average size less than 0.005 inch.

12. A method as defined in claim 10 wherein said step of supporting said tube comprises positioning a substantially rigid and longitudinally extending elongated support member below the center of said tube, and attaching said tube to said support member to provide for movement of said tube between the collapsed and inflated configurations.

* * * * *